Aug. 29, 1944.  J. EDGAR  2,357,094
BROACHING METHOD
Original Filed Nov. 29, 1935   3 Sheets-Sheet 1
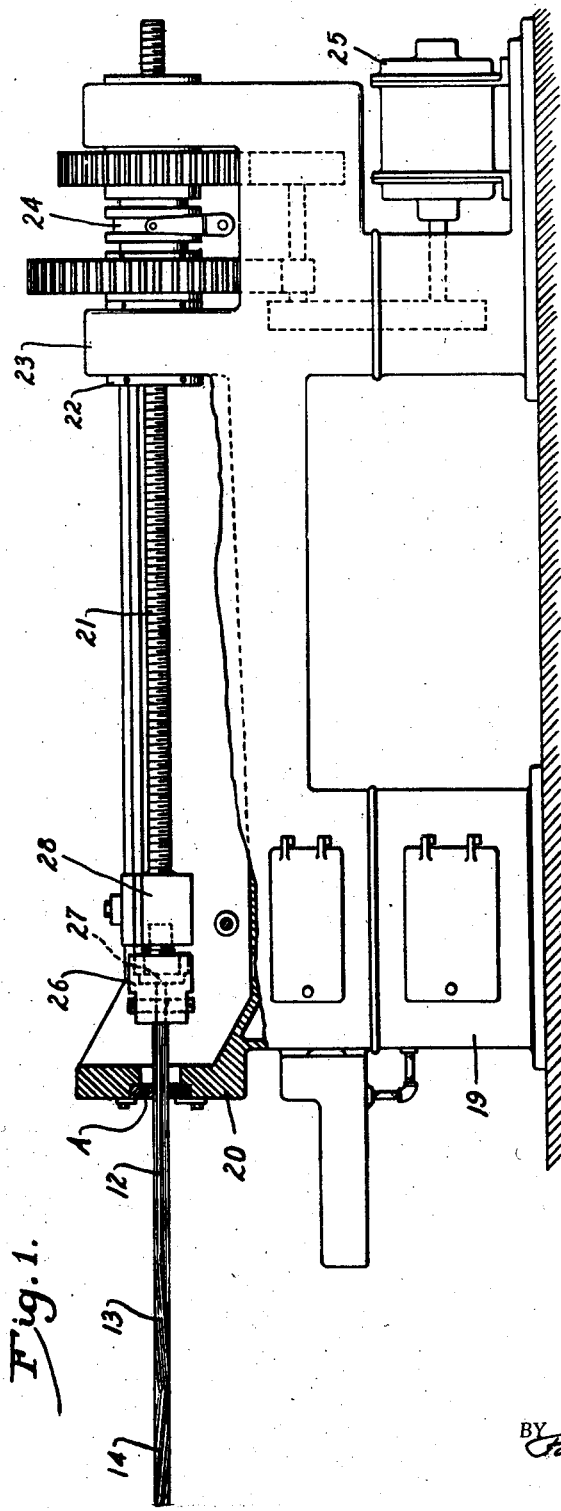
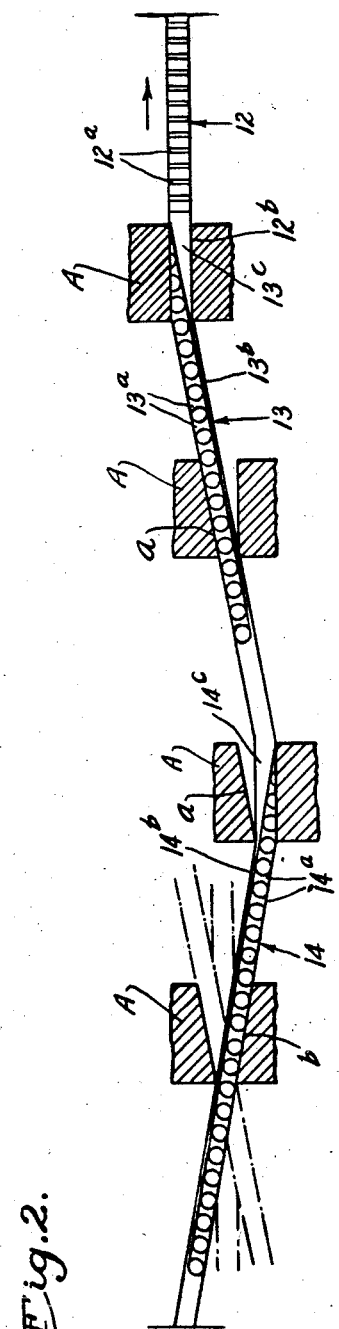
INVENTOR.
John Edgar
BY Parker, Carlson, Pitzner & Hubbard
ATTORNEY.

Aug. 29, 1944.  J. EDGAR  2,357,094
BROACHING METHOD
Original Filed Nov. 29, 1935   3 Sheets-Sheet 2
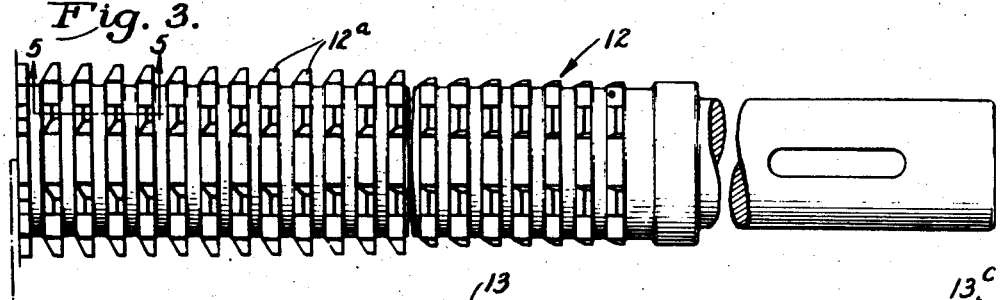
Fig. 3.
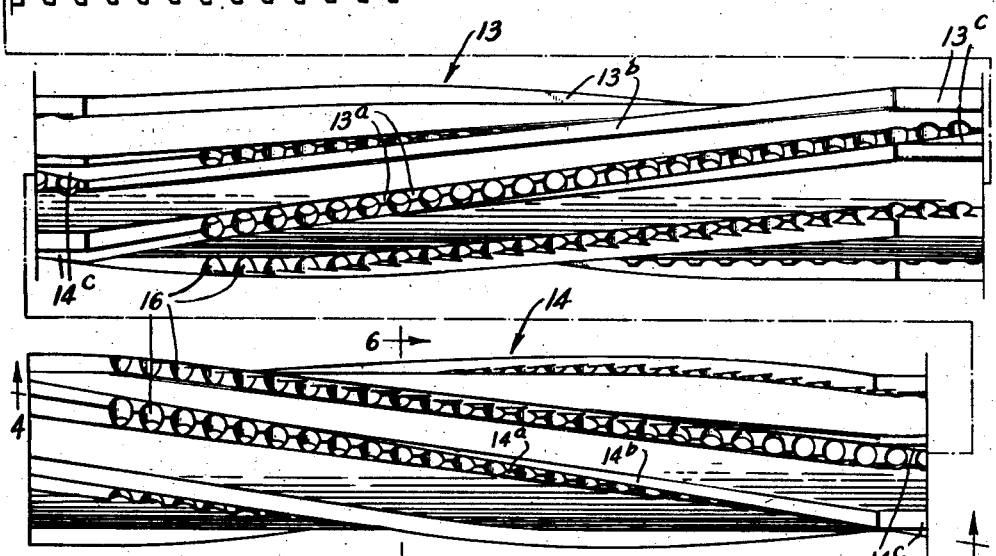
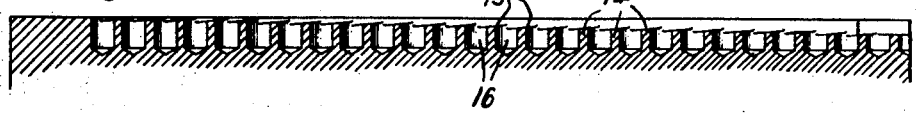
Fig. 4.
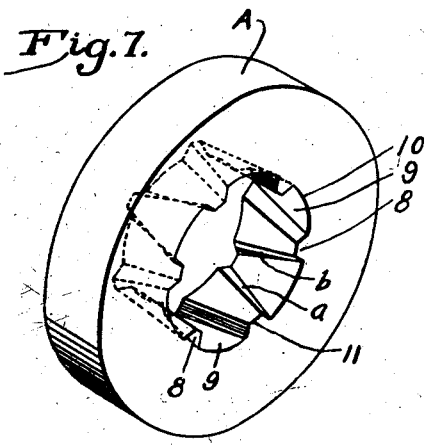
Fig. 7.
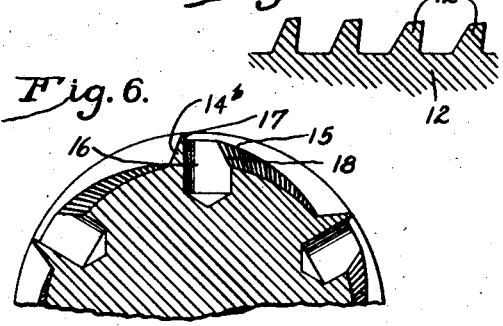
Fig. 5.
Fig. 6.
INVENTOR.
John Edgar
BY
Parker, Carlson, Pitzner + Hubbard
ATTORNEY.

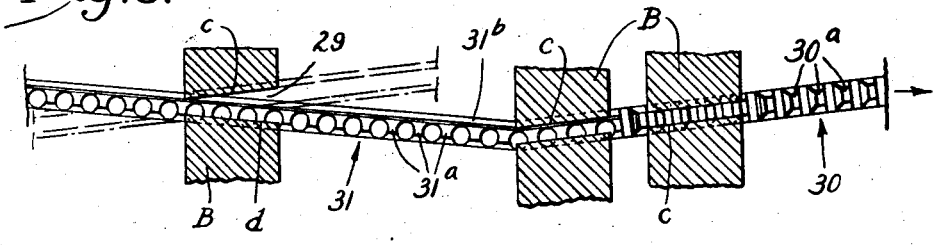
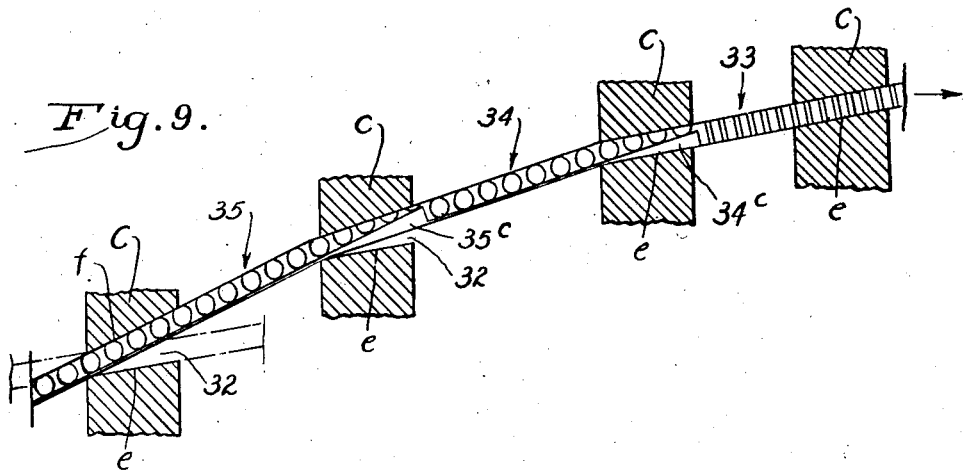
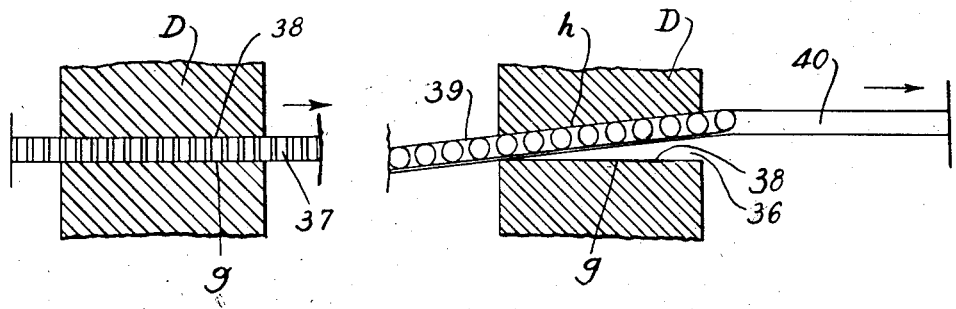

Patented Aug. 29, 1944

2,357,094

UNITED STATES PATENT OFFICE 2,357,094

BROACHING METHOD

John Edgar, Rockford, Ill., assignor to Barber-Colman Company, Rockford, Ill., a corporation of Illinois Original application November 29, 1935, Serial No. 52,061. Divided and this application April 22, 1939, Serial No. 269,346

8 Claims. (Cl. 90—33)

The present invention relates to a new and improved method of broaching.

One of the primary objects of the present invention is to provide a novel method of broaching tapered spline grooves which may have either one helical side and one straight side, or opposite helical sides with leads of equal degree in opposite directions, or leads of unequal degree in the same or opposite directions.

A further object of the invention is to provide a novel method of making a spiral broach having a series of helically arranged teeth with a guiding surface along one side and chip clearance along the opposite or cutting side.

Other objects and advantages will become apparent as the description proceeds.

In the accompanying drawings,

Figure 1 is a front elevational view, partially in vertical section, of a broaching machine embodying the features of my invention.

Fig. 2 is a diagrammatic view representing progressive steps in a broaching method embodying the features of my invention.

Fig. 3 is a side elevational view on an enlarged scale of a broach adapted for use in practicing the method.

Fig. 4 is a fragmentary longitudinal sectional view of the broach taken along helical line 4—4 of Fig. 3.

Fig. 5 is a fragmentary axial sectional view taken along line 5—5 of Fig. 3.

Fig. 6 is a transverse sectional view taken along line 6—6 of Fig. 3.

Fig. 7 is a perspective view of one form of work piece adapted to be broached by the present method.

Figs. 8, 9 and 10 are diagrammatic representations respectively of three modified methods of broaching three different forms of work pieces.

The method of broaching within the broad concept of the present invention as defined by the appended claims may be adapted for various kinds of work. However, the method is especially adapted for and hence is disclosed as employed in the broaching of the outside member A of a wedge spline coupling of the type disclosed in my prior Patent No. 2,038,554, issued April 28, 1936.

Referring to Fig. 7, the work member A, which may constitute the hub of a gear, propeller or other part adapted to encircle an inside member (not shown), comprises a plurality of internal spline keys 8 separated by interdental keyways 9. The keys 8 extend generally longitudinally of the axis, and are uniformly peripherally spaced. In the present instance, the roots 10 of the keyways 9 and the inner faces 11 of the keys 8 are cylindrical segments, and concentric to the axis of the member A.

The keys 8 and hence the keyways 9 taper uniformly in width from end to end. One side $a$ of each keyway 9 is helicoidal in form with a predetermined lead in one direction. Preferably, the opposite side $b$ of each keyway 9 is also helicoidal in form, and has a lead of the same degree as the side $a$ but in the opposite direction. The inside member (not shown) has keys with complemental sides adapted for surface wedging engagement with the sides $a$ and $b$.

One broach adapted for use in carrying out the method is illustrated in Figs. 3 to 6, and comprises an elongated body adapted to be pulled back axially through the work member A. The broach is made up of a plurality of axially aligned cutting sections 12, 13 and 14.

The leading section 12 is tapered longitudinally, and comprises a plurality of peripherally spaced series of longitudinally aligned relieved teeth $12^a$ increasing progressively in height (see Fig. 5) and adapted to cut straight parallel keyways $12^b$ (see Fig. 2). The width of the keyways $12^b$ is the same as the minimum width (i. e., the width at the small ends) of the keyways 9 to be produced.

The number of series of teeth $12^a$ is dependent on the number of keyways to be cut. For one keyway only one series of teeth would be provided. Since the work member A has six keyways 9, the broach is herein shown with six series of teeth $12^a$.

The next section 13 is provided to cut the helicoidal sides $a$ of the keyways 9, and has a plurality of series of helically aligned teeth $13^a$ with a lead in one direction. Similarly, the last section 14 is provided to cut the helicoidal sides $b$, and has a plurality of series of helically aligned teeth $14^a$ with a lead the same in degree as, but in a direction opposite that of, the teeth $13^a$. Hence, the series of teeth $13^a$ and $14^a$ correspond in number and peripheral spacing to the teeth $12^a$.

The series of teeth $13^a$, being provided to cut the helicoidal sides $a$, are formed with cutting edges only at one side, and are caused to travel in a helical path through the work. Preferably, the relative rotation between the work and the broach, in timed relation to the relative axial feed, is obtained by having the noncutting sides of the series of teeth $13^a$ coact with the inlet edges of the sides of the keyways $12^b$ opposite the sides being cut. Hence, the threads defined by the teeth $13^a$ are the same in width as the keyways 12ᵇ, and the sides thereof opposite the cutting sides are formed with guiding surfaces 13ᵇ of uninterrupted contour. Preferably, the guiding surfaces 13ᵇ are on the leading side of the tooth thread so that they will press against the work the entire time that the section 13 is in cutting engagement therewith.

The series of teeth 14ᵃ for cutting the helicoidal sides b are the same in all respects as the teeth 13ᵃ with the exceptions that the lead of the thread is in the opposite direction, and the cutting edges are on the opposite side, while guiding surfaces 14ᵇ of uninterrupted contour are provided for engagement with the inlet edges of the sides a.

The series of teeth 12ᵃ, 13ᵃ and 14ᵃ are so arranged that as the section 12 leaves the work, the section 13 is in proper registration with the keyways 12ᵇ, and when the section 13 leaves the work, the section 14 is in proper registration therewith. Preferably, straight pilot or guiding sections 13ᶜ and 14ᶜ are interposed respectively between the sections 12 and 13, and 13 and 14. Each of the pilot sections is substantially equal in length to the keyways 9. The pilot section 13ᶜ has uninterrupted noncutting surfaces on one side adapted for sliding engagement with the sides of the preliminary grooves 12ᵇ opposite the teeth 13ᵃ, and is adapted to guide the lead end of the section 13 firmly and accurately into cutting engagement with the work piece A. To obtain a greater number of teeth for a given over-all length of broach, the leading teeth 13ᵃ are formed in the other side of the guiding section 13ᶜ, and are fragmentary in character. The pilot section 14ᶜ is the same in construction as, but reversed in reference to, the section 13ᵃ, and serves to guide the section 14 into the work.

In each of the sections 13 and 14, the teeth are tapered progressively in height (see Fig. 4) and are formed to cut primarily at and adjacent the top outer edges 15. Also, the teeth are relieved and are separated by chip clearance spaces, preferably in the form of blind radial holes 16. These holes are of suitable depth, are tangent to the guide portions having the uninterrupted surfaces 13ᵇ or 14ᵇ, and intersect the cutting sides of the tooth threads (see Fig. 6).

Each of the sections 13 and 14 may be made conveniently by milling a series of helical keys or splines on the broach body. In each instance, these splines would correspond in number and spacing to the tapered keyways to be cut, and would have the same transverse width and contour as the ways at their small ends. The splines for the sections 13 and 14 would have the same leads respectively as the sides a and b of the keyways. Holes, defining the chip clearance spaces 16, are now drilled in uniformly spaced relation in the splines. The holes 16 have axes offset from the axis of the broach and are of a size such that they will be tangent to the outer edges of the noncutting side portions of the splines as indicated at 17, thereby leaving these portions uninterrupted to define the guiding surfaces 13ᵇ or 14ᵇ, and will intersect the opposite or tooth sides of the splines as indicated at 18 to provide for the escape of chips. The metal in front of the first hole 16 now is milled away to the root of the splines, and in front of successive holes is milled away at progressively increasing height increments, for example, of .0025 inch, until the outside diameter is reached. Now, the tops of the stepped surfaces are given a cutting rake to relieve the semicircular cutting edges defined by the trailing portions of the holes 16.

The method of broaching herein disclosed may be carried out on a machine (see Fig. 1) comprising an elongated base 19 on one end of which is a support 20 for the work A. A non-rotatable feed screw 21 extends axially of the work A through and in threaded engagement with a nut 22 which is rotatable in a bearing 23 on the other end of the base 19, and which is adapted to be driven in either direction through a reversing gearing 24 from a source of power 25.

The broach is connected to the free end of the screw 21 for axial movement through the work A. Relative rotary movement is imparted to the work A and the broach as the sections 13 and 14 pass through the cutting zone. Preferably, the work A is held in fixed position, and the broach is rotated. The rotation of the broach is effected and controlled through coaction of the guiding surfaces 13ᵇ or 14ᵇ with the work. Hence, the broach is secured to the end of the screw 21 by a swivel connection comprising a shell 26 to which the broach is keyed, and an inner stud 27 rotatably confined within the shell and fixed to a crosshead 28 on the screw.

The method of broaching the member A is illustrated in Fig. 2. With the member A clamped in fixed position, the broach is pulled axially therethrough. The roughing section 12 cuts the straight parallel grooves 12ᵇ (see Fig. 2). During this stage, the broach does not rotate. As the section 12 leaves the work, the pilot section 13ᶜ guides the section 13 into the grooves 12ᵇ, the guide surfaces 13ᵇ engaging the end edges of the adjacent sides of the grooves to position the teeth 13ᵃ. In the continued axial movement of the broach, the section 13 is rotated through coaction of the guide surfaces 13ᵇ with the work, and the teeth 13ᵃ cut the helicoidal sides a of the member A progressively to full depth. Upon completion of the sides a, the guiding section 14ᶜ directs the section 14 into the work with the guide surfaces 14ᵇ engaging the adjacent end edges of the sides a to position the teeth 14ᵃ. The broach is now rotated in the reverse direction so that the sides b will be cut progressively to depth with a constant lead equal in degree but opposite in direction to that of the sides a.

While the work A, with keyways 9 having helicoidal surfaces a and b of equal lead in opposite directions and hence defining symmetrically formed keys 8, is illustrated in detail, it is to be understood that the method is adapted to cut other work members of the same general type but differing in specific form.

In the method employed in cutting keyways 9 having a width at their large ends up to three times that of their small ends, a three-section broach, as illustrated in Figs. 1 to 6, preferably is used. Where the width at the large ends does not exceed twice that at the small ends of the keyways, the straight cutting section 12 may be eliminated, thereby resulting in a two-section broach consisting of the sections 13 and 14. In this event, no preliminary straight grooves 12ᵇ are produced, and the teeth 13ᵃ are formed like the teeth 12ᵃ to cut at both sides of the tops.

Modifications of the method adapted to broach three other forms of work pieces B, C and D are diagrammatically illustrated respectively in Figs. 8, 9 and 10. The work piece B is the same in all respects as the work piece A with the exception that the opposite leads of the helicoidal sides c and d of the keyways 29 are unequal in degree and the width of the keyways at the large end does not exceed twice that at the small end. In this instance, a broach, having two sections 30 and 31, is employed first to cut a series of helical grooves having a lead equal to that desired on the sides c of the keyways 29, and then to cut the other sides d of the keyways with the desired lead in the opposite direction. Thus, the leading section 30 corresponds to the section 12, and accordingly has a plurality of peripherally spaced series of helically aligned relieved teeth 30ª of progressively increasing height, with a constant lead in one direction equal to that of the sides c, and excepting for this lead similar to the teeth 12ª. The trailing section 31 is like section 14, and hence has a plurality of series of helically aligned teeth 31ª extending along a noncutting guiding surface 31ᵇ and having a constant lead opposite and unequal in degree to that of the teeth 30ª for cutting the sides d with the desired lead.

The work piece C has keyways 32 each of which is formed with helicoidal sides e and f having leads of unequal degree in the same direction. The width of the keyways 32 at the large ends exceeds twice but not three times that at the small ends. In all other respects, the work piece C is the same as the work pieces A and B. The broach for cutting the work piece C comprises three sections 33, 34 and 35. The leading section 33 serves to cut the helicoidal sides e with the desired lead, and excepting for the lead is like section 12. The trailing section 35 serves to cut the helicoidal sides f with the desired lead in the same direction but greater in degree than that of the sides e. Excepting for a possible difference in lead, the construction of the section 35 is the same as that of the section 14. Pilot sections 34ᶜ and 35ᶜ may be interposed respectively between broach sections 33 and 34, and 34 and 35, and each is aligned with the immediately preceding broach section.

It is to be noted that in each of the foregoing instances, two broach sections determine the final or ultimate form of the sides of the keyways. Where the width of the large end of the keyways exceeds the aggregate effective width of these two end sections, one additional broach section or more for taking one or more intermediate cuts may be provided. The additional broach section or sections may be located at any suitable point in advance of the trailing section. Thus, in Figs. 1 to 3, the section 12 is provided to cut away the central stock, and is located in the lead. The broach section 34 in Fig. 9 cuts the intermediate portion of the keyways 32, and is located between the end sections 33 and 35. Hence, the section 34 has a lead greater than that of the section 33 and less than that of the section 35. Excepting for the difference in lead angle, the section 34 is the same in construction as the section 35.

It will be understood that the initial cut need not necessarily define the ultimate form of one side of the keyways as in Fig. 9. In Fig. 2, the initial cut removes the intermediate stock, and subsequently finish cuts are taken on both sides of the preliminary grooves.

The work piece D (see Fig. 10) has keyways 36, each having one side g plane and parallel to the axis, and another side h helicoidal in form with a lead in one direction. A straight broach section 37, the same in construction as the section 12, cuts preliminary straight grooves 38 to define the sides g. Subsequently, a helical broach section 39 is used to cut the opposite sides h with the desired lead. The section 39 is the same in construction as the section 13.

The various broach sections for different work pieces may be connected together as in Figs. 1 to 9, or may be separate as in Fig. 10. It is usually desirable to employ separate broach sections where the sections if combined would result in a broach of objectionable or inconvenient length, as, for example, where exceptionally long work pieces are to be cut or where a large number of sections are required because of unusual divergence of the sides of the keyways.

A noncutting pilot member 40 may be provided on the lead end of any broach adapted to enter a preformed groove whether consisting of a single section or a multiple of sections.

This application is a division of my copending application Serial No. 52,061, filed November 29, 1935 (Patent No. 2,173,901).

I claim as my invention:

1. The method of broaching tubular work pieces with internal keyways tapered in width and having helicoidal sides with leads in opposite directions, comprising first simultaneously broaching a plurality of straight parallel keyways corresponding in number and peripheral spacing to said first mentioned keyways, then simultaneously cutting one series of sides of said last mentioned keyways with helicoidal surfaces having a constant lead in one direction, and then simultaneously cutting the opposed sides of said last mentioned keyways with helicoidal surfaces having a constant lead in the opposite direction.

2. The method of forming tubular spline members with internal keyways tapered in width and having at least one series of sides with helicoidal surfaces of a constant lead in one direction comprising first cutting a plurality of straight parallel spaces corresponding in number and peripheral spacing to said first mentioned keyways, and then cutting said series of sides with said helicoidal surfaces.

3. The method of forming spline members with keyways tapered in width and having helicoidal sides of unequal degree in the same direction comprising first cutting a plurality of helical grooves corresponding in number and spacing to said keyways, and then cutting the trailing sides of said grooves to provide a greater lead thereon in the same direction.

4. The method of forming spline members with keyways tapered in width and having helicoidal sides of unequal degree in the same direction comprising first cutting a plurality of helical grooves corresponding in number to said keyways to produce the sides of smallest lead, then cutting the trailing sides of said grooves at a greater lead to remove intermediate stock, and then taking a second cut on said last mentioned sides of said grooves at a still greater lead to form the other sides of said keyways.

5. The method of forming tubular spline members with interdental keyways tapered in width and having helicoidal sides with leads in opposite directions, comprising first cutting a plurality of helical grooves of a predetermined lead in one direction and corresponding in number and peripheral spacing to said keyways to form one series of corresponding sides of said keyways, and then cutting the sides of said grooves opposite said last mentioned sides with helicoidal surfaces having a predetermined lead in the opposite direction.

6. The method of making a helical metal broach comprising forming a helical key on an elongated body, forming a plurality of openings in longitudinally spaced relation in said key, said openings being located eccentrically of said key to preserve one side with an uninterrupted guiding contour and to intersect the other side of said key for chip clearance, removing the metal of said key in front of said openings respectively in progressively decreasing amounts to define stepped cutting edges of progressively increasing height increments along said body, and relieving the backs of said cutting edges.

7. The method of broaching a work piece with a keyway tapered in width, comprising taking three successive cuts in said work piece in longitudinally diverging directions, one of said cuts serving to remove intermediate stock, another of said cuts serving to broach one side of said keyway to ultimate tapered form with the broaching tool slidably guided by the other side of said keyway, and the remaining cut serving to broach the other side of said keyway to ultimate tapered form with the broaching tool slidably guided by said one side of said keyway.

8. The method of broaching a work piece with a keyway tapered in width and having helicoidal sides with equal leads in opposite directions, comprising first broaching a straight groove in said work piece, then broaching one side of said groove with a cut of progressively increasing depth and in a direction helicoidal relative to the work piece to provide a helicoidal surface having a constant lead in one direction, and then broaching the opposite side of said groove with a cut of progressively increasing depth and in a direction helicoidal relative to the work piece to provide a helicoidal surface having a constant lead equal in degree to said first mentioned lead but in the opposite direction.

JOHN EDGAR.